United States Patent
Oosterhof et al.

(10) Patent No.: US 11,155,896 B2
(45) Date of Patent: Oct. 26, 2021

(54) PROCESS FOR THE RECOVERY OF LITHIUM

(71) Applicant: Umicore, Brussels (BE)

(72) Inventors: Harald Oosterhof, Westerlo (BE); David Dupont, Hoboken (BE)

(73) Assignee: UMICORE, Brussels (BE)

( * ) Notice: Subject to any disclaimer, the term of this patent is extended or adjusted under 35 U.S.C. 154(b) by 222 days.

(21) Appl. No.: 16/345,269

(22) PCT Filed: Oct. 24, 2017

(86) PCT No.: PCT/EP2017/077048
§ 371 (c)(1),
(2) Date: Apr. 26, 2019

(87) PCT Pub. No.: WO2018/082961
PCT Pub. Date: May 11, 2018

(65) Prior Publication Data
US 2019/0292629 A1    Sep. 26, 2019

(30) Foreign Application Priority Data
Nov. 7, 2016 (EP) .................................. 16197579

(51) Int. Cl.
*C22B 26/12* (2006.01)
*C22B 7/04* (2006.01)

(52) U.S. Cl.
CPC ............... *C22B 26/12* (2013.01); *C22B 7/04* (2013.01); *Y02P 10/20* (2015.11)

(58) Field of Classification Search
CPC ......... C22B 26/12; C22B 7/004; C22B 7/006; B01D 15/00; A62D 3/36; A62D 3/32
See application file for complete search history.

(56) References Cited

U.S. PATENT DOCUMENTS 2,516,109 A * 7/1950 Ellestad .................. C22B 26/12
                                                                423/193
2,801,153 A    7/1957 Dwyer

FOREIGN PATENT DOCUMENTS

| CN | 1229059 A | 9/1999 |
|----|-----------|--------|
| CN | 103086405 A | 5/2013 |
| CN | 105907983 A | 8/2016 |
| KR | 101569490 B1 * | 11/2015 |
| WO | 2011141297 A | 11/2011 |

OTHER PUBLICATIONS

Cho Bong Suk, Neutralizing Method for Waste Sulfuric Acid Using De-Sulfurized Slag, Nov. 17, 2015, English Translation of KR-101569490-B1 (Year: 2015).*
Cao Naizhen, Method of extracting lithium from furnace slag generated from pyrogenic process recovery of lithium battery, Sep. 31, 2016, English Translation of CN-105907983-A (Year: 2016).*
ISA/EP; International Search Report and Written Opinion for International Application No. PCT/EP2017/077048 dated Jan. 3, 2018.
Database WPI, Week 200003, Thomson Scientific, London, GB; AN 2000-024146, XP002767981.
CNIPA; Office Action for Chinese Patent Application No. 201780065439.4 dated Mar. 3, 2021, 16 pages.

* cited by examiner

*Primary Examiner* — Keith D. Hendricks
*Assistant Examiner* — Phillip H Leung
(74) *Attorney, Agent, or Firm* — NK Patent Law

(57) ABSTRACT

A process is divulged for the recovery of lithium from metallurgic slags comprising the steps of roasting spodumene to convert it from the alpha to the beta variant; reacting the beta variant with sulfuric acid, using a stoichiometric excess of acid; repulping the reaction product with water, forming an acidic slurry; neutralizing the acidic slurry to a pH between 5 and 7, by addition of at least one neutralizing agent; filtrating the neutralized slurry, thereby obtaining a lithium bearing solution and a residue; characterized that, in either one or both of the steps of repulping and neutralizing the acidic slurry, lithium-bearing metallurgic slag is added as neutralization agent. The lithium-bearing metallurgic slag is used to substitute at least part of the classic neutralizing agent. The lithium in the slag is released, and added to the lithium liberated from the spodumene.

7 Claims, No Drawings

PROCESS FOR THE RECOVERY OF LITHIUM

CROSS-REFERENCE TO RELATED APPLICATIONS

This application is a U.S. National Stage application of International Application No. PCT/EP2017/077048, filed on Oct. 24, 2017, which claims the benefit of European Patent Application No. 16197579.2, filed Nov. 7, 2016.

The present invention relates to an enhanced process for the recovery of lithium from a lithium-bearing slag.

Such a slag can be obtained when recycling lithium-ion batteries or their derived products using a pyrometallurgical smelting process. The batteries and a slag-forming flux, comprising one or more of oxides of silicon, calcium, aluminum, magnesium, iron, and manganese, are melted together at high temperature. An oxygen potential is chosen that result in the formation of a cobalt-nickel-copper metallic phase, and a slag. The more easily oxidized elements, where under lithium, report to the slag. The organic fraction in the batteries is effectively pyrolized, and the residual volatiles are captured in an off-gas purification system.

The recovery of lithium from such slags has been studied but remains complex and expensive. According to known processes, the slag is leached in acidic conditions. A leachate containing most of the lithium is then obtained. The aluminum in the slag is however partially soluble, causing problems such as the precipitation of lithium aluminates and the formation of aluminum hydroxide flakes that tend to adsorb lithium. These phenomena may degrade the lithium recovery yield.

Despite these technical hurdles, the slag issued from the pyrometallurgical treatment of lithium-ion batteries represents a high-grade source of lithium.

CN105907983(A) proposes a method to extract lithium from such a slag. The slag is dissolved in sulfuric acid in dilute conditions, in order to prevent the precipitation of lithium aluminates when the solution is neutralized to a pH of about 6. The leachate needs to be concentrated by evaporation of water before being further processed. Although technically feasible, this process is not economical as the diluted operating conditions call for an expensive subsequent evaporation step. Also, the amounts of reagents needed for the subsequent neutralization and purification are considerable, leading to the production of gypsum that cannot be valorized.

WO2011141297(A1) uses a lithium-bearing slag produced from the pyrometallurgical treatment of lithium-ion batteries as an additive in concrete. This method takes advantage of the beneficial properties of lithium to reduce the reaction of alkali metals in the concrete. It provides for a meaningful utilization of the slag as such, but does not lead to the recovery of lithium. This reduces the economic value of the slag.

It thus appears that the separation of lithium from aluminum- and lithium-bearing slags is problematic, as both aluminum and lithium leach during acid treatment, and tend to co-precipitate.

Another widely exploited source of lithium is spodumene. Spodumene is a pyroxene mineral consisting of lithium alumino-silicate, $LiAl(SiO_3)_2$. The equivalent of approximately 80.000 tons of lithium carbonate is annually produced from this source. The spodumene processing flow sheet usually consists of a number of unit operations, comprising the steps of:

roasting spodumene to convert it from the alpha to the beta variant;

reacting the beta variant with sulfuric acid, using a stoichiometric excess of acid;

repulping the reaction product with water, forming an acidic slurry;

neutralizing the acidic slurry to a pH between 5 and 7, by addition of at least one neutralizing agent;

filtrating the neutralized slurry, thereby obtaining a lithium bearing solution and a residue;

purification and precipitation of the lithium, typically as hydroxide or carbonate.

After spodumene ores have been mined, concentrated and comminuted, the finely divided material is submitted to a first high-temperature treatment step during which alpha spodumene is converted into beta spodumene. After the phase transformation, the material is mixed with sulfuric acid and submitted to a roasting step that aims to liberate the lithium from the mineral. This step is performed at 250-300° C. with an excess of acid w.r.t. lithium.

The roasted material is subsequently mixed with water, upon which the $Li_2SO_4$ dissolves, together with the free sulfuric acid. Remarkably, no aluminum is leached in this step. This is assumed to be due to the stable alumino-silicate framework that is formed during the alpha to beta conversion of spodumene. Next, a conventional neutralizing agent such as $CaCO_3$, $CaO$, or $Ca(OH)_2$ is added to neutralize the free acid and to precipitate a number of impurities.

Typically, the neutralization step is performed at a pH of 5 to 6 so as to remove impurities such as aluminum, silicon and iron from the solution. A solid-liquid separation step is applied to separate the crude $Li_2SO_4$ solution from the residue that contains aluminum silicates, gypsum and precipitated impurities mostly.

Further purification steps are then applied for the removal of calcium, magnesium, and other impurities.

Although variants of this process are being applied by different lithium producers, most of these flow sheets feature some inherent drawbacks. In particular, the excess sulfuric acid that is used in the roasting step will need to be neutralized prior to the purification steps, and this will require considerable amounts of neutralizing agent. Classically, calcium-based compounds are used, leading to the formation of a large amount of gypsum, which is considered as an undesired, yet unavoidable waste.

It has now been found that the usual spodumene processing flow sheet, and the flow sheet for processing lithium- and aluminum-bearing slags, can be combined in a way to solve the problems associated with each.

To this end, a process is divulged for the recovery of lithium from metallurgic slags comprising the steps of roasting spodumene to convert it from the alpha to the beta variant; reacting the beta variant with sulfuric acid, using a stoichiometric excess of acid; repulping the reaction product with water, forming an acidic slurry (solid/liquid mixture); neutralizing the acidic slurry to a pH between 5 and 7, by addition of at least one neutralizing agent; filtrating the neutralized slurry, thereby obtaining a lithium bearing solution and a residue; characterized that, in either one or both of the steps of repulping and neutralizing the acidic slurry, lithium-bearing metallurgic slag is added as neutralization agent.

As the skilled person will appreciate, repulping and neutralization can be combined in a single step.

The lithium-bearing metallurgic slag is hereby used to substitute at least part of the conventional neutralizing agent.

In this neutralization step, most of the lithium in the slag is released and supplements the lithium liberated from the spodumene.

To ensure the optimum release of the lithium from the slag, it is preferred to neutralize with lithium-bearing slag up to a pH of less than 4. One can then proceed with a conventional neutralization agent to reach a pH between 5 and 7. This latter pH range provides for the preliminary purification of the leachate, in particular by precipitation of aluminum. Suitable conventional agents are $CaCO_3$, $CaO$, and $Ca(OH)_2$, which can be combined. Sodium-based agents are also suitable.

The lithium-bearing slag will typically originate from smelting of lithium-bearing primary or secondary batteries, or their derived products, such as spent batteries, battery scrap, black mass, etc., as long as appreciable quantities of lithium remain present.

Suitable slags may have a by-weight composition according to: $3\% < Li_2O < 20\%$; $38\% < Al_2O_3 < 65\%$; $CaO < 55\%$; and, $SiO_2 < 45\%$.

With respect to the recovery of lithium from aluminum- and lithium-bearing slags, the introduction of the slag in the spodumene flow sheet gives rise to only a modest increase of the aluminum concentration in the leachate. The amount of slag used to perform the neutralization is indeed relatively minor in view of the total quantity of leachate. It has been determined that this modest increase of the aluminum concentration can be dealt with, as it does not lead to unacceptable losses of lithium.

With respect to the spodumene flow sheet, the incorporation of the slag as neutralizing agent reduces significantly the amount of gypsum that is formed during conventional neutralization. Neutralizing with a lithium-bearing compound moreover enriches the solution in lithium, leading to generally better economy and recovery yield.

In another embodiment, a first neutralization step is performed using a conventional lithium-free neutralization agent. This is followed by a second neutralization step performed using lithium-bearing slag. Optionally, and for the reasons explained above, a third neutralization step can be performed, again using a conventional agent. The rationale behind this scheme is that less aluminum is leached from the slag, as it does not encounter the initial strongly acidic conditions. The contained lithium still leaches with high yields, as long as the pH remains below about 4.

In another embodiment, the lithium-bearing slag is added to the spodumene in the step of reacting. This embodiment is especially useful when the slag is richer in lithium than the spodumene, as it will lead to an advantageous increase of the lithium concentration in the leachate. However, the amount of gypsum is not reduced in this case.

In Example 1, a typical spodumene flow sheet is illustrated comprising the steps:

thermal treatment 1050° C. during 30 min.;

sulphate roasting at 250° C. during 30 min., using 1.4 times the stoichiometric amount required for lithium leaching in spodumene (3.3% Li), corresponding to 330 g sulfuric acid per kg spodumene, of which 95 g is excess; and, leaching with a liquid/solid ratio of 1.85 for 15 min. at room temperature.

TABLE 1

| Initial composition of roasted beta-spodumene (%) | | | |
| --- | --- | --- | --- |
| Li | Ca | Al | Si |
| 3.3 | 0 | 14 | 30 |

TABLE 2

| Composition of the acidic leaching solution (g/L) | | | | |
| --- | --- | --- | --- | --- |
| $Li_2SO_4$ | $H_2SO_4$ | Ca | Al | Si |
| 140 | 51 | 0 | 0 | 0 |

The excess acid is neutralized by addition of $Ca(OH)_2$, followed by filtration. The elemental composition of the filtrate remains hereby essentially unchanged. The solution can be purified and lithium precipitated, resulting in a lithium yield of about 90%.

In Example 2, the same conditions as in Example 1 are applied. However, the excess acid is neutralized to about 1 g/l $H_2SO_4$, which corresponds to a pH of about 2, by addition of lithium bearing slag according to the composition reported in Table 3.

TABLE 3

| Composition of the lithium-bearing slag (%) | | | |
| --- | --- | --- | --- |
| Li | Ca | Al | Si |
| 5.0 | 8.98 | 17.66 | 10.61 |

TABLE 4

| Composition of the leaching solution after neutralization with slag (g/L) | | | | |
| --- | --- | --- | --- | --- |
| $Li_2SO_4$ | $H_2SO_4$ | Al | Ca | Si |
| 164 | 1 | 2.2 | 0.5 | — |

The lithium concentration in the solution is significantly higher than when a conventional neutralizing agent is used, thanks to the contribution of the lithium in the slag. The leachate however contains a limited amount of aluminum. It is therefore important to show that this limited amount will not result in lithium losses.

This is the object of Example 3.

In this Example, an acidic solution containing 18 g/L Li (equivalent to 143 g/L $Li_2SO_4$) and 50 g/L $H_2SO_4$ is prepared. This corresponds to the composition of a typical spodumene leaching solution. This solution is heated to 70° C. and subsequently neutralized to a pH of 2.5 using a milled sample of lithium-containing slag. Lithium (3%), aluminum (19%), calcium (19%), and $SiO_2$ (21%) are the most important constituents of the slag, which is found to also contain traces of Co, Cu, Fe, Mg, Ni and Mn.

After neutralization to pH 2.5, a sample of the slurry is filtered and washed, and both the filtrate and the residue are analyzed for lithium and aluminum. The filtrate contains 6.4 g/L Al and the residue contains 0.11% Li. From these values, leaching yields of about 100% for lithium and aluminum are determined.

The pH of the slurry is further raised to 5.5 using lime, in order to purify it by precipitating the dissolved aluminum.

This slurry is filtered and washed, and both the filtrate and the residue are analyzed for lithium and aluminum. The filtrate contains 1.1 mg/L Al, indicating that virtually all the aluminum is precipitated. The residue is found to contain 0.58% Li.

The aluminum is thus thoroughly eliminated from the filtrate. As for lithium, it can be calculated that the solution contains, in addition to all the lithium of the original solution, also about 60% of the lithium added with the slag. The overall lithium recovery in the purified filtrate is thus good.

Example 4 illustrates that a reduction in the amount of aluminum in the leaching solution further limits the loss of lithium when the solution is purified. Hitherto, the quantity of slag used in the neutralizing step is reduced, and complemented by another neutralizing agent such as lime.

The same acidic solution and milled slag as in Example 3 are prepared. This solution is however neutralized to a pH of 0.5 instead of 2.5 using the slag. The amount of slag is about half the amount needed in Example 3.

After neutralization to pH 0.5 using slag, the pH of the slurry is further raised to 5.5 using lime, in order to purify it by precipitating the dissolved aluminum. This slurry is filtered and washed, and both the filtrate and the residue are analyzed for lithium and aluminum. The filtrate contains 1 mg/L Al, indicating that virtually all the aluminum is precipitated. The residue is found to contain 0.3% Li.

The aluminum is thus thoroughly eliminated from the filtrate. As for lithium, it can be calculated that the solution contains, in addition to all the lithium of the original solution, also about 80% of the lithium added with the slag. The overall lithium recovery in the purified filtrate is thus excellent.

The invention claimed is:

1. Process for the recovery of lithium from metallurgic slags comprising the steps of:
    roasting spodumene, at least a portion of which is in a naturally occurring alpha state, to convert the alpha variant of the spodumene to the beta variant;
    reacting the beta variant with sulfuric acid, using a stoichiometric excess of acid;
    repulping the reaction product with water, forming an acidic slurry;
    neutralizing the acidic slurry to a pH between 5 and 7, by addition of at least one neutralizing agent; and
    filtrating the neutralized slurry, thereby obtaining a lithium bearing solution and a residue;
    wherein lithium-bearing metallurgic slag is added in one or more of the steps of reacting, repulping, and neutralizing the acidic slurry.

2. Process according to claim 1, wherein the lithium-bearing metallurgic slag is added in either one or both of the steps of repulping and neutralizing the acidic slurry, as a neutralizing agent.

3. Process according to claim 2, wherein, in the step of neutralizing the acidic slurry, lithium-bearing metallurgic slag is added as a first neutralization agent to increase the pH of the acidic slurry while maintaining a pH of less than 4, and a second neutralization agent is added to further increase the pH of the acidic slurry until a pH between 5 and 7 is reached.

4. Process according to claim 3, wherein the second neutralization agent comprises $CaCO_3$, $CaO$, or $Ca(OH)_2$.

5. Process according to claim 1, wherein the lithium-bearing metallurgic slag is produced by smelting of lithium-bearing batteries or their derived products.

6. Process according to claim 1, wherein the lithium-bearing metallurgic slag has a by-weight composition according to: $3\% < Li_2O < 20\%$; $38\% < Al_2O_3 < 65\%$; $CaO < 55\%$; and, $SiO_2 < 45\%$.

7. Process according to claim 1, further comprising the steps of purifying the lithium bearing solution, and separating the lithium from the lithium bearing solution by precipitation.

* * * * *